United States Patent [19]
Reilly

[11] Patent Number: 4,973,240
[45] Date of Patent: Nov. 27, 1990

[54] MULTIPLE DIE PASTRY CRUST PRESS AND CRUST PAN HANDLING ARRANGEMENT

[75] Inventor: Arthur J. Reilly, Downers Grove, Ill.

[73] Assignee: Comtec Industries, Ltd., Hickory Hills, Ill.

[21] Appl. No.: 456,362

[22] Filed: Dec. 26, 1989

[51] Int. Cl.[5] .................. A21C 11/00; B29C 43/04
[52] U.S. Cl. .................................. 425/195; 99/353; 99/432; 425/346; 425/412
[58] Field of Search ............. 425/193, 195, 334, 340, 425/346, 412; 426/496, 512; 99/439, 442, 432, 353

[56] References Cited

U.S. PATENT DOCUMENTS

| | | | |
|---|---|---|---|
| 1,752,837 | 4/1930 | Corns | 425/346 |
| 2,209,141 | 7/1940 | Schnell | 425/340 |
| 3,015,287 | 1/1962 | Noel | 425/195 |
| 3,202,114 | 8/1965 | Cameron et al. | 426/391 |
| 3,290,154 | 12/1966 | Turner | 426/26 |
| 3,296,956 | 1/1967 | Turner | 99/439 |
| 3,518,091 | 6/1970 | Turner | 425/391 |
| 3,669,605 | 6/1972 | Reilly | 425/398 |
| 4,371,327 | 2/1983 | Fievez | 425/218 |

FOREIGN PATENT DOCUMENTS

0008988  3/1980  European Pat. Off. .............. 99/432

Primary Examiner—Willard Hoag
Attorney, Agent, or Firm—Kinzer, Plyer, Dorn, McEachran & Jambor

[57] ABSTRACT

A hydraulic press for simultaneously forming a plurality of pastry crusts under pressure in individual pans. The pans are loaded into a carrier tray, each pan is filled with a pre-portioned quantity of dough and the tray is placed between the upper and lower dies of the hydraulic press. Alignment elements formed on the hydraulic press and the carrier tray align the pans with the dies as the press closes. The resulting pastry crusts are formed with a uniform thickness throughout the crust. If desired and when the dies are so fabricated, crusts with different thicknesses at the bottom, side wall and flange of the crust can be formed. Pressure forming crusts eliminates the need for handling scrap dough which is usually trimmed and recovered in rolled or sheeted crust production.

9 Claims, 3 Drawing Sheets

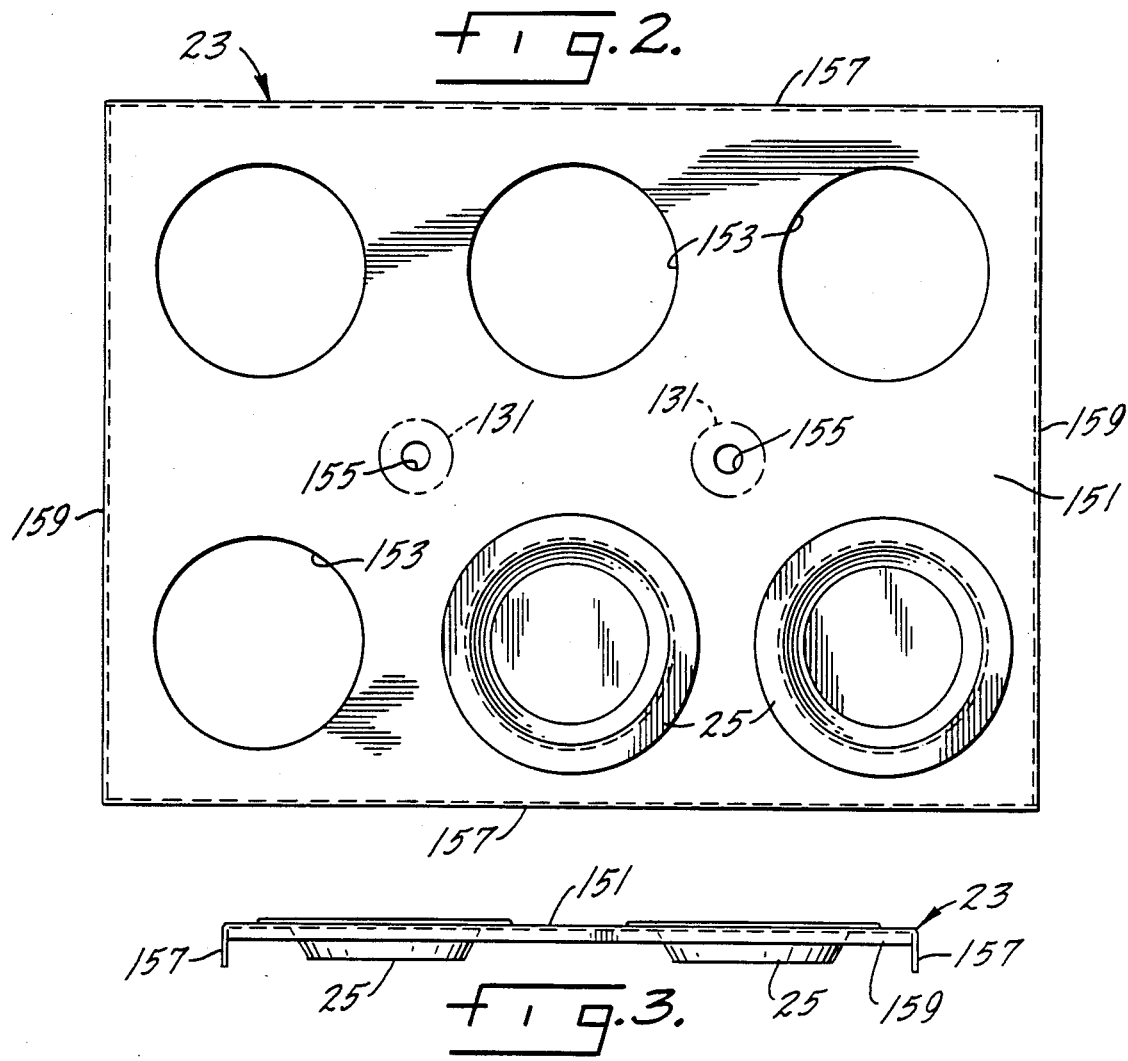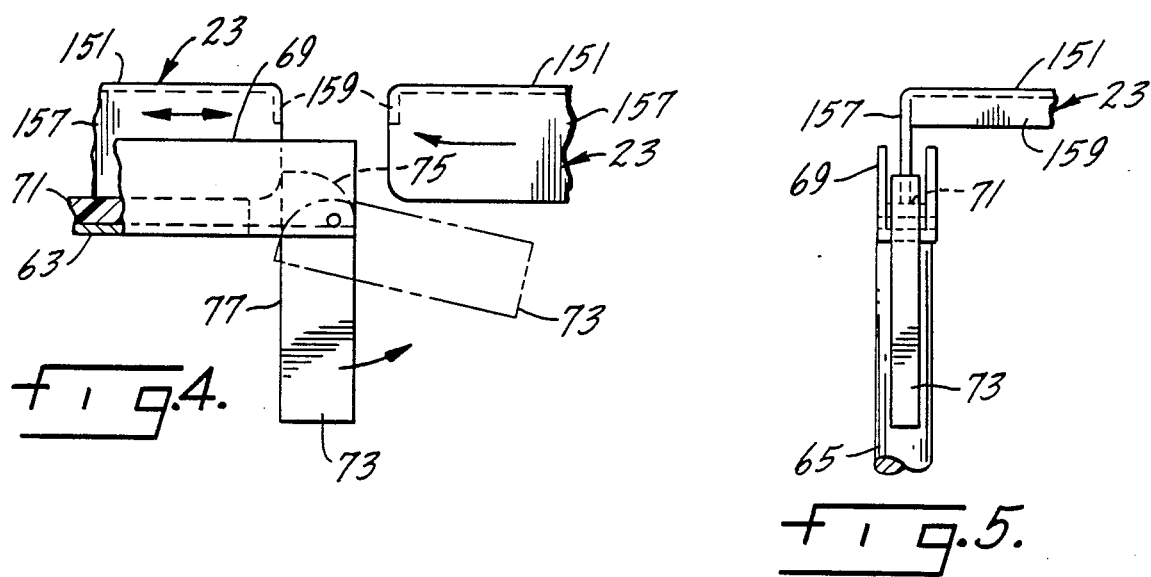

MULTIPLE DIE PASTRY CRUST PRESS AND CRUST PAN HANDLING ARRANGEMENT

BACKGROUND AND SUMMARY OF THE INVENTION

This invention is concerned with an apparatus for the high volume, scrapless production of pie, tart, quiche and similar crusts in individual pans. It is particularly concerned with such an apparatus using a hydraulic press having multi-head crust forming dies.

An object of this invention is a multi-head pastry crust press in which the dough is loaded in pre-portioned quantities into individual crust pans which are placed in a precision dimensioned carrier tray so that the individual pans of dough do not have to be rehandled during crust formation, baking, filling and other operations to minimize labor costs.

An object of this invention is a precision dimensioned carrier tray for individual dough pans, which carrier tray becomes an integral part of the multi-head forming press to insure precision alignment of the individual dough pans with the dies thereby preventing pressure deformation of incorrectly supported individual crust pans.

Another object of this invention is a multi-head hydraulic press using a carrier tray which automatically aligns the individual crust pans with the dies.

Other objects of the invention will be found in the following specification, claims and drawings.

BRIEF DESCRIPTION OF THE DRAWINGS

The invention is illustrated more or less diagrammatically in the following drawings wherein:

FIG. 2 is an enlarged, top plan view of a foil pan carrier tray of this invention with two empty foil crust pans positioned in openings in the carrier tray;

FIG. 3 is an end elevational view of a carrier tray of FIG. 2 with foil crust pans shown in the carrier tray openings;

FIG. 4 is an enlarged, partial view of carrier trays entering the tray support mechanism of the press with a stop mechanism shown in its moved position in phantom lines;

FIG. 5 is a partial end elevational view of the mechanism of FIG. 4; and

DESCRIPTION OF THE PREFERRED EMBODIMENT

Figure 1:
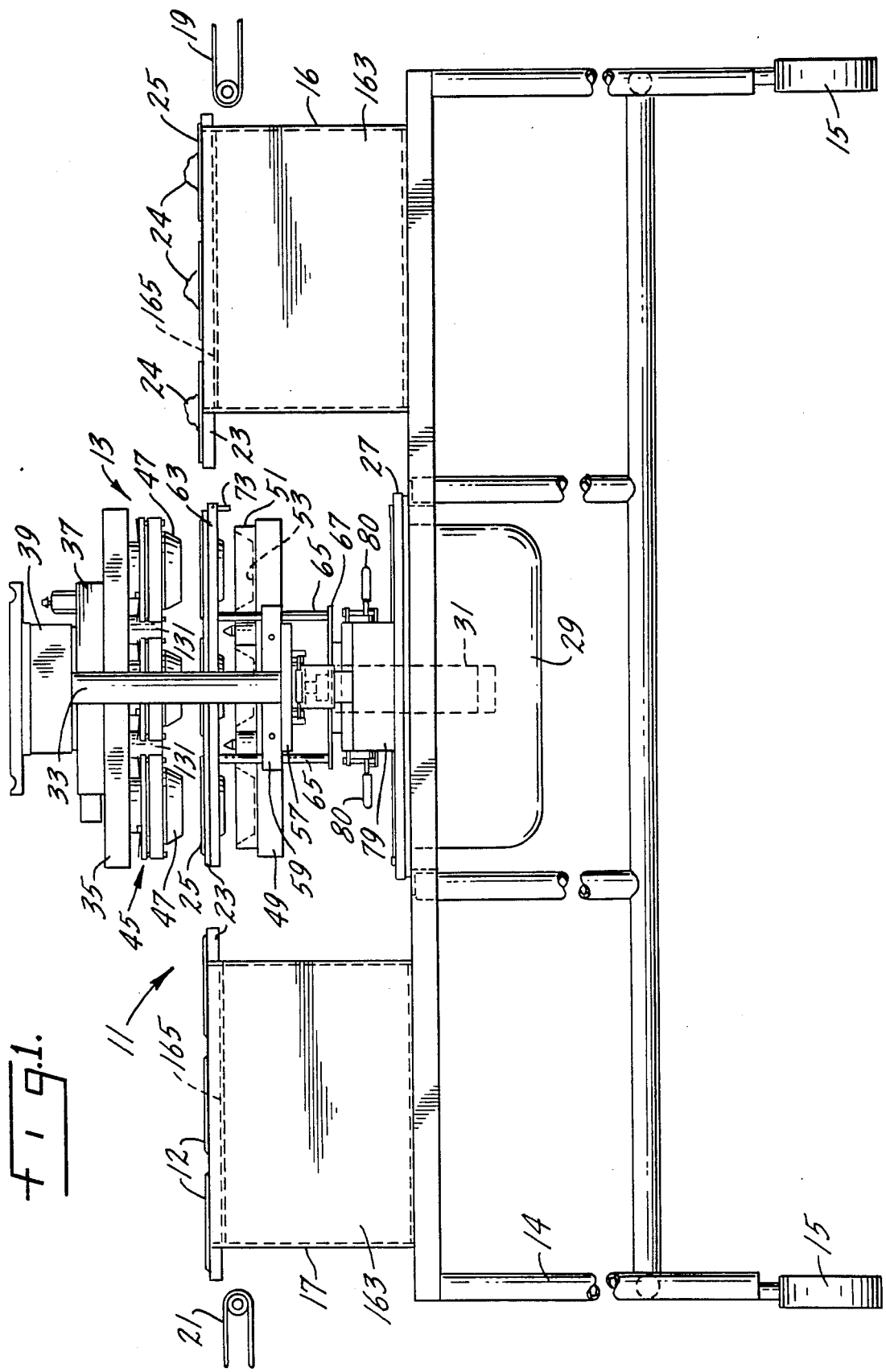
FIG. 1 is a side elevational view of the crust-forming apparatus of this invention, with some parts broken away and others shown in dashed lines for clarity of illustration.

FIG. 1 of the drawings shows an apparatus 11 of this invention for simultaneously pressure forming at one time a plurality of pastry crusts 12 and the like. It includes a multi-die hydraulic press 13. This press is similar in construction to the hydraulic press shown in my U.S. Pat. No. 3,669,605, issued June 13, 1972. The disclosure of my patent is incorporated herein by reference. The hydraulic press 13 of this application differs essentially from the press shown in my '605 patent by the substitution of multiple dies for the single die shown in my patent. The pie, tart and pastry crust press 13 is supported on a wheeled table 14 having lockable castor wheels 15. Mounted on the table are an in-feed platform 16 and an outflow platform 17. An in-feed conveyor 19 supplies the in-feed platform 16 and an outflow conveyor 21 removes the formed crusts 12 from the outflow platform 17. The in-feed platform 16 and outflow platform 17 support carrier trays 23 each filled with a predetermined quantity of dough 24 prior to movement into the press 13 and upon movement out of the press 13. Each carrier tray supports a plurality of rimmed pastry crust pans 25 which are conventionally made of thin aluminum foil, plastic, paper, etc.

A base 27 for the hydraulic press 13 is supported at the center of the table 14 with a hydraulic reservoir 29 located beneath the press and a hydraulic cylinder 31 located in the reservoir in the manner described in my U.S. Pat. No. 3,669,605. A pair of die support posts 33 are located on opposite sides of the press and support an upper die plate 35. An electric heater 37 is located on top of the upper die plate and it is controlled by appropriate equipment in the electrical housing 39 on top of the heater.

An upper set of crust-forming dies 45 are attached to the lower side of the upper die plate 35 in a manner to be hereinafter described. Each set of dies includes six convex dies 47 in this example. There is also a lower die plate 49 mounted on the die support posts 33 for vertical movement. A lower set of six dies 51 is mounted on the top of this plate and consists of individual concave dies 53. A die lifter plate 57 supports the lower die plate 49. Also supported by the die lifter plate are a pair of die plate bars 59 which are fastened by screws 61 to the lower die plate 49.

A carrier tray 23 and lifter 63 is mounted above the lower set of dies 51 and is supported by four legs 65 which rest on a platform 67 mounted on the top of the hydraulic cylinder 31. The legs 65 extend through openings 66 in the die plate bars 59. The tray lifter 63 has upwardly-opening, U-shaped channels 69 (FIGS. 4 and 5) on opposite sides thereof to support the carrier tray 23 in a manner to be hereinafter described. At the base of each U-shaped channel is a liner 71 made of an ultra-high density polyolefin material.

A pivotally-hanging stop bar 73 is located at the entrance to each U-shaped channel 69, shown in FIGS. 1, 4 and 5, to properly position the carrier trays 23 on the tray lifter 63. The stop bar has a rounded top 75 facing the in-feed platform 16 and a flat face 77 facing the tray lifter 63. As shown in FIGS. 4 and 5, as a carrier tray 23 being slid from the in-feed platform 16 engages the rounded top 75 of the hanging stop bar, the stop bar is flipped upwardly as shown by the arrow in FIG. 3. Once the carrier tray is on the tray lifter 63, the operator moves it backwardly toward the in-feed platform 16 where it engages the flat face 77 of the pivotally hanging bar which has swung back by gravity into the solid line position in FIG. 4 to engage and stop the tray in the proper position of alignment relative to the dies.

A hydraulic control housing 79 is located on top of the base 27 of the press and the dual operating levers 80 are attached to the control housing in the manner described in my previously-mentioned U.S. Pat. No. 3,669,605.

Figure 6:
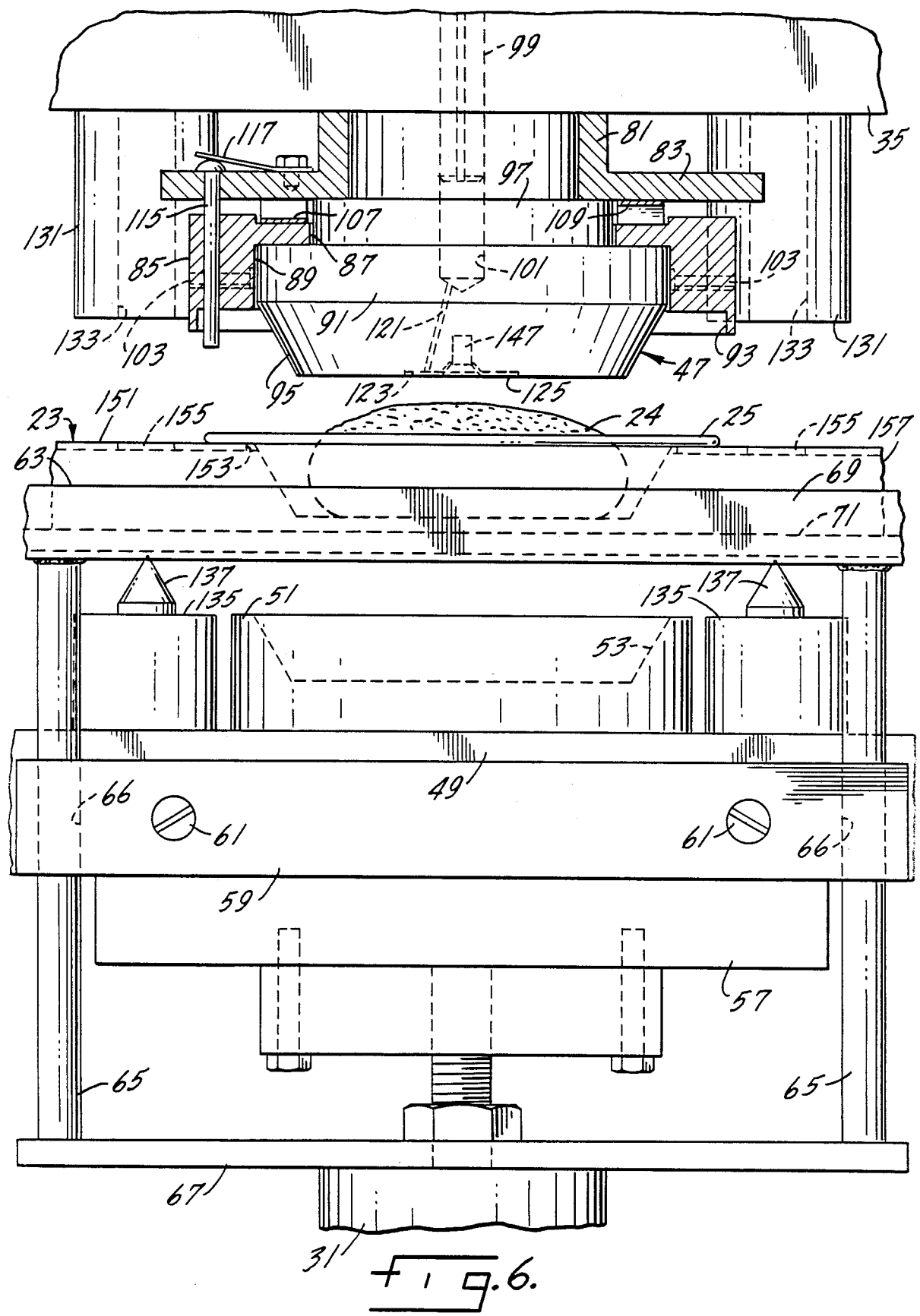
FIG. 6 is an enlarged view of a portion of the crust-forming hydraulic press of FIG. 1, with some parts shown in cross-section and others in dashed lines.

Referring now to FIG. 6 of the drawings which shows a typical upper and lower die 47 and 51, respectively, of the press, a convex upper die 47 is attached to the upper die plate 35 by a collar 81 having an outwardly-extending, integral, annular flange 83. Positioned below the annular flange is a crust-confining ring 85 which has a central passage 87 and an annular die-receiving pocket 89 around the central passage 87, which pocket receives the cylindrical base 91 of the convex die 47. A shallow outer pocket 93 is also formed in the ring around the die to receive the truncated, convex portion 95 of the die. The flexible, resilient mounting of the crust-retaining ring 85 permits dough 24 to flow over the rim of the pan 25 and form a rim on the crust 12. The pocket 93 of the ring may be formed with a crested upper surface to form a crested rim on the crust 12. The die also has a stepped neck 97 which engages the annular flange 83 of the collar 81 and the upper die plate 35 and is held in position by a bolt 99 mounted on the upper die plate 35. The bolt extends into an internally threaded blind hole 101 formed in the upper die plate 35 and the die 47.

Radially-extending air passages 103 are formed in the crust ring 85 and extend from the pocket 89 outwardly. These passages prevent build-up of excess dough between the upper die 47 and the ring 85 by allowing the excess dough to extrude through these passages. An upwardly-opening, annular channel 107 is formed in the top of the crust ring 85 surrounding its central passage 87 and a wave spring 109 is positioned in this channel to engage the annular flange 83 of the collar 81 and to bias the ring 85 against the die 47.

The flexible, resilient mounting of the ring 85 using the wave spring 109 accommodates slight variations in the quantity of dough 24 placed in each crust pan 25. The wave spring allows the ring to move upwardly to prevent a build up of pressure against any excess dough which may build up on the rim of the pan 25. Headed stripper pins 115 are mounted on the annular flange 83 of the collar 81 and extend through the ring 85 to enlarge the formed crust 12 or the rimmed pastry shell pans 25. A leaf spring 117 is mounted on the collar 81 to bias each stripper pin in a downwardly direction.

An air passage 121 extends from the blind hole 101 to a circular recess 123 formed in the bottom of the die 47. A thin, circular steel membrane 125 is held in this recess by a screw 147. The air passage and membrane provide distributed air flow to separate the finished crust 12 from the die 47.

Also mounted on the upper die plate 35 are upper die stops 131, each having a locator hole 133, as shown most clearly in FIG. 6. Corresponding lower die stops 135 are mounted on the movable die plate 49, with each stop having a die locator pin 137 which cooperates with the locator hole 133 to align the upper and lower dies.

As can be most clearly seen in FIGS. 2 and 3 of the drawings, the carrier tray 23 is formed from a sheet of aluminum and has a top planar support surface 151 in which there are formed circular openings 153 which receive the rimmed pastry shell pans 25 for supporting the pans. Also formed in the planar support surface 151 are tray alignment openings 155 which receive the die locator pins 137 previously described to align the tray and its openings 153 with the upper and lower sets of dies. As shown most clearly in FIG. 3 of the drawings, the tray includes integral side walls 157 and end walls 159 with the side walls extending a greater depth than the end walls. The shorter depth at the ends walls is to permit the end walls to pass over the U-shaped channels 69 of the tray lifter 63, as shown in FIG. 5 of the drawings.

The in-feed and out-feed platforms 16 and 17 are identical in construction and include side walls 163 which extend above a top planar wall 165, which receives and supports the downwardly projecting side walls 157 of carrier tray 23, as shown most clearly in FIG. 1 of the drawings.

I claim:

1. An apparatus for pressure-forming a plurality of pastry crusts and the like, including:
    a set of truncated, conical-shaped, convex upper dies,
    a complimentary set of truncated, conical-shaped, concave lower dies,
    a carrier tray having a surface with a set of openings extending therethrough,
    each opening adapted to receive a rimmed pastry shell pan supported on said surface of said tray by its rim, with each opening associated with an upper and lower die,
    carrier tray alignment means formed on one of said sets of dies,
    alignment openings formed in said carrier tray to receive said carrier tray alignment means to align the shell pan openings with said upper and lower dies, and
    means to move said upper and lower dies together into pastry crust forming relation.

2. The apparatus of claim 1 including die movement stop means associated with said upper and lower dies, with said stop means engaging said carrier tray surface to establish the final closing distance between said upper and lower dies.

3. The apparatus of claim 1 further characterized in that said carrier tray includes integrally-formed, downwardly-extending side and end walls, with said side walls extending downwardly a greater distance than said end walls.

4. The apparatus of claim 3 further including means to support said carrier tray between said sets of upper and lower dies to permit lifting of said carrier tray by said lower dies.

5. The apparatus of claim 4 in which said means to support said carrier tray includes a pair of upwardly opening channels, each channel adapted to receive a side wall of said carrier tray.

6. The apparatus of claim 5 in which each of said channels has a bottom surface which engages and supports a downturned side wall of said tray, with said bottom surface formed of an ultra-high density molecular polyolefin.

7. The apparatus of claim 1 further including a confining ring surrounding each convex upper die and mounted for movement relative to said die, said confining ring defining an annular recess around said die to receive the rim of the crust, and biasing means to maintain said confining ring in position relative to said die.

8. A carrier tray for rimmed pastry crust pans for use in a pressure forming apparatus having a set of truncated, conical-shaped, convex upper dies, a complimentary set of truncated, conical-shaped, concave lower dies, carrier tray alignment means formed on one of said set of dies, and means to support said carrier tray between said sets of upper and lower dies, said carrier tray including:
    a planar support surface having a set of openings extending therethrough,
    each opening adapted to receive a rimmed pastry pan which is supported on said support surface by said rim, with each opening associated with an upper and lower die of said sets of dies, alignment openings formed in said support surface to receive said carrier tray alignment means, said pastry pan receiving openings being positioned relative to one another and to said alignment openings in the same manner that said truncated, conical-shaped dies are positioned relative to one another and to said carrier tray alignment means.

9. The carrier tray of claim 8 further characterized in that said carrier tray includes integrally-formed, downwardly-extending side and end walls, with said side walls extending downwardly a greater distance than said end walls.

* * * * *